US012649332B2

(12) United States Patent
Yadav et al.

(10) Patent No.: US 12,649,332 B2
(45) Date of Patent: Jun. 9, 2026

(54) MODULAR PDU WHEEL ASSEMBLY

(71) Applicant: Goodrich Corporation, Charlotte, NC (US)

(72) Inventors: Sanjay Yadav, Bangalore (IN); Mohinder Saini, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 803 days.

(21) Appl. No.: 17/889,305

(22) Filed: Aug. 16, 2022

(65) Prior Publication Data

US 2023/0249493 A1    Aug. 10, 2023

(30) Foreign Application Priority Data

Feb. 4, 2022    (IN) ............................. 202241006074

(51) Int. Cl.
| | |
|---|---|
| *B60B 3/14* | (2006.01) |
| *B60B 3/08* | (2006.01) |
| *B60B 27/00* | (2006.01) |
| *B64D 9/00* | (2006.01) |

(52) U.S. Cl.
CPC ................. B60B 3/14 (2013.01); B60B 3/08 (2013.01); B60B 27/00 (2013.01); B60B 27/0015 (2013.01); B64D 9/00 (2013.01); *B64D 2009/006* (2013.01)

(58) Field of Classification Search
CPC .. B60B 11/06; B60B 3/14; B60B 3/08; B60B 3/087; B60B 19/12; B60B 27/00; B60B 27/0015; B60B 27/0021; B60B 27/0026; B64D 9/00; B64D 2009/006; B65D 2009/006; B65G 39/00; B65G 39/10; B65G 39/04; B65G 39/02; B65G 39/12; B65G 13/00; B65G 13/071
See application file for complete search history.

(56) References Cited

U.S. PATENT DOCUMENTS

| | | | | |
|---|---|---|---|---|
| 3,105,371 A | * | 10/1963 | 101963 ................... | F16D 7/025 |
| | | | | 74/411 |
| 6,871,823 B2 | * | 3/2005 | Roberts .................... | B64D 9/00 |
| | | | | 414/373 |
| 2009/0036283 A1 | | 2/2009 | Maumus | |
| 2014/0076684 A1 | * | 3/2014 | Specht ................... | B65G 39/02 |
| | | | | 193/37 |
| 2014/0326574 A1 | * | 11/2014 | Kalitta ................. | B65G 39/025 |
| | | | | 193/35 MD |
| 2015/0148206 A1 | * | 5/2015 | Bischof .................... | D21G 1/02 |
| | | | | 492/53 |
| 2020/0086689 A1 | * | 3/2020 | Scheer ................ | B60C 11/0041 |
| 2022/0379658 A1 | * | 12/2022 | Wang ...................... | B60B 11/02 |

* cited by examiner

*Primary Examiner* — Glenn F Myers
(74) *Attorney, Agent, or Firm* — SNELL & WILMER L.L.P.

(57) ABSTRACT

A modular wheel assembly for a power drive unit (PDU) may comprise a hub and a disc stack coupled to the hub. The hub may be a splined hub defining a plurality of spline recesses. The disc stack may comprise a plurality of discs. Each disc of the plurality of discs may comprise a ring having a plurality of splines that are complementary to the spline recesses, and that are configured to interlock with the spline recesses. Each disc may further comprise an annular segment made of one of a first material and second material. The annular segment may be a tire. In the event of damage or wear, each disc in the plurality of discs may be removed and repaired or replaced.

12 Claims, 10 Drawing Sheets

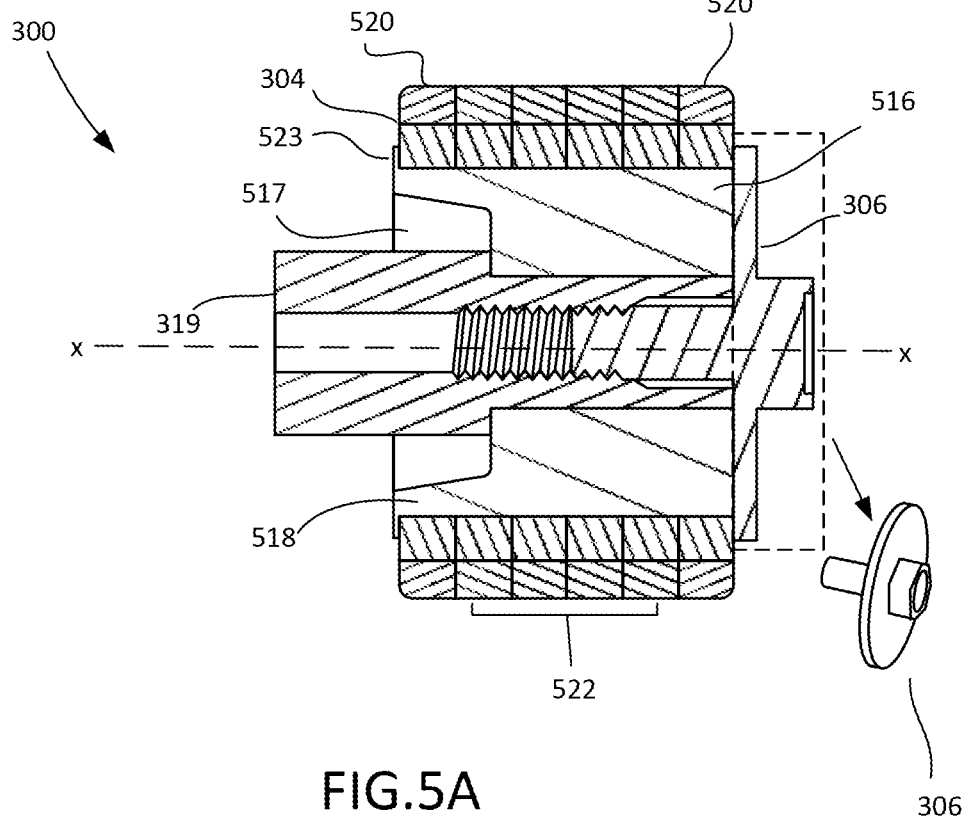
FIG.5A
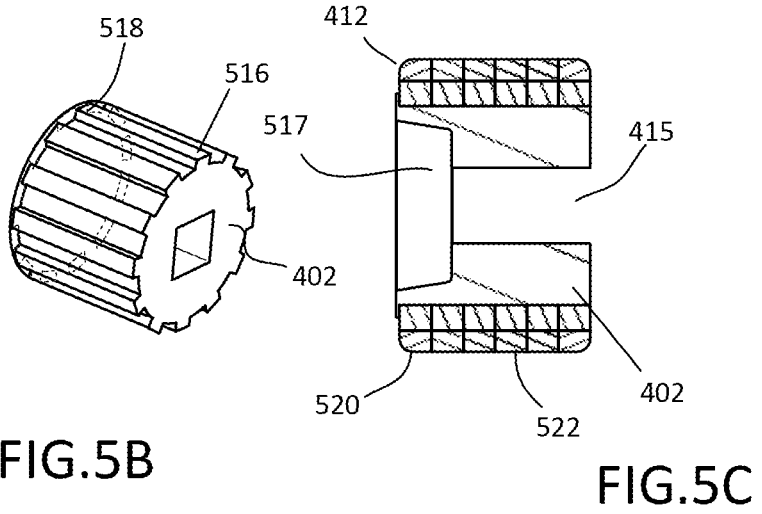
FIG.5B                    FIG.5C

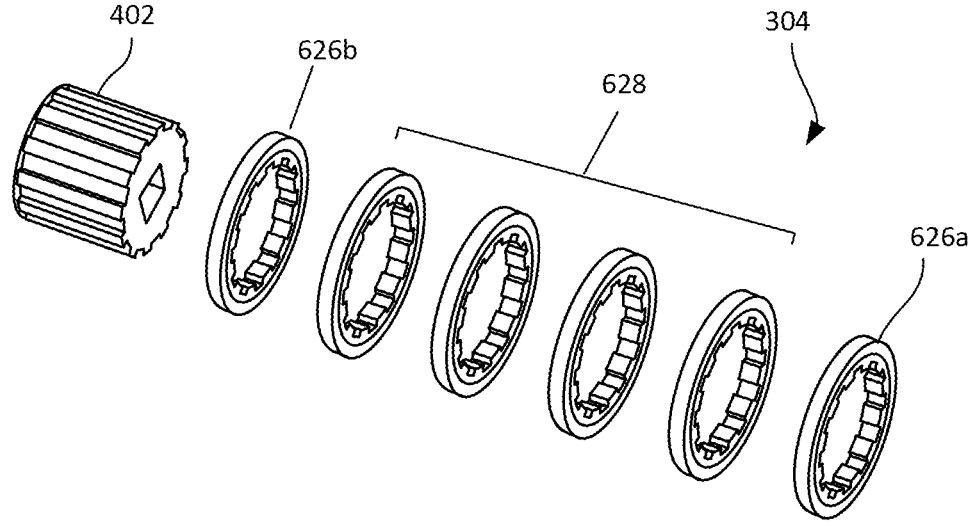
FIG.6A
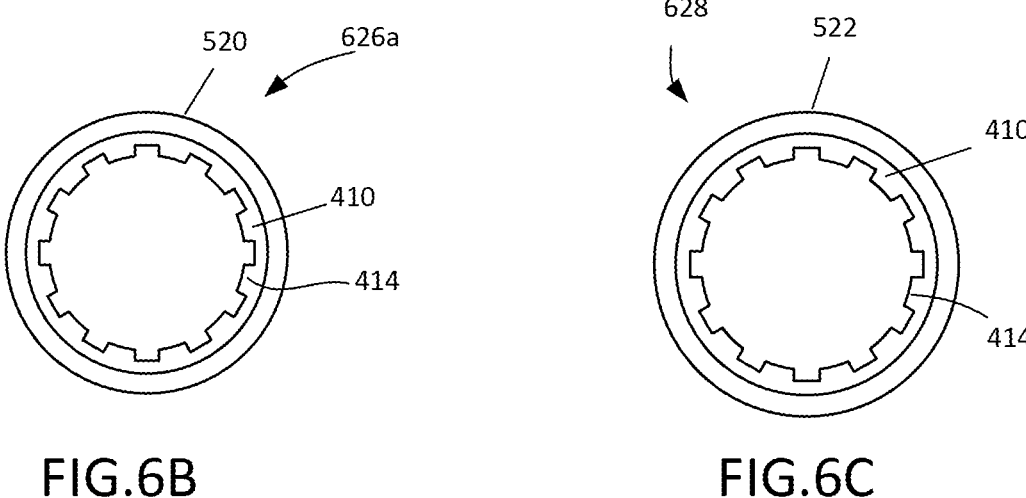
FIG.6B                                          FIG.6C

300

304

402

415

410

412

522

402

410

MODULAR PDU WHEEL ASSEMBLY

CROSS-REFERENCE TO RELATED APPLICATIONS

This application claims priority to, and the benefit of, India Provisional Patent Application No. 202241006074, filed Feb. 4, 2022 (DAS Code 7A8E) and titled "MODULAR PDU WHEEL ASSEMBLY," which is incorporated by reference herein in its entirety for all purposes.

FIELD

The present disclosure relates to a wheel, and more specifically, to a modular splined PDU wheel.

BACKGROUND

Many aircraft have at least one cargo bay designed to receive cargo. These aircraft cargo bays utilize powered cargo loading systems comprising a plurality of powered drive units (PDUs) to assist the loading of cargo and equipment into the aircraft. A train and/or series of PDUs may serve to assist pallets and containers of desired dimensions to travel down from fore to aft and from aft to fore of an aircraft (e.g., down the body of the aircraft), typically to the main and lower cargo compartments of the aircraft. Conventionally, PDUs comprise tires to provide motive force and adequate traction to move air freight pallets and containers within the cargo bay, and into and out of the cargo bay. The tires may include thin layers of friction material molded onto a large diameter rigid hub. Typically, PDU tires used in cargo handling systems need to be replaced due to chipping, which render them less effective in providing traction. Frequent replacements add to maintenance costs.

SUMMARY

A modular wheel assembly is disclosed herein. In various embodiments, the modular wheel assembly may comprise a hub. In various embodiments, the hub may be a splined hub. In various embodiments, the hub may further define a plurality of splined recesses. In various embodiments, the modular wheel assembly may comprise a disc stack. The disc stack may be coaxial to the hub. In various embodiments, the disc stack may comprise a plurality of discs. Each disc of the plurality of discs may be configured to slidably couple along an axis of the hub onto the hub so that each disc of the plurality of discs is radially outward the hub. In various embodiments, the hub may circumferentially retain the disc stack. In various embodiments, each disc of the plurality of discs may comprise a ring and an annular segment. In various embodiments, the annular segment may be molded onto the ring.

In various embodiments, the ring may comprise a plurality of splines extending from the ring. In various embodiments, each spline recess may be coupled to a complementary interlocking spline extending from the ring. In various embodiments, the hub may further comprise a first end and a second end. The first end may be distal the second end.

In various embodiments, the annular segment may be made of at least one of a first material and a second material. In various embodiments, the first material may be stiffer than the second material. In various embodiment, the first material and the second material may be different materials. In various embodiments, the plurality of discs may comprise terminal discs proximal the first end and proximal the second end. Each annular segment of each terminal disc may be made of the first material. In various embodiments, the plurality of discs may comprise a plurality of discs distal the first end and distal the second end. Each annular segment of each of the distal discs may be made of the second material.

In various embodiments, each annular segment may be made of a composite of a first material and a second material. In various embodiments, the first end may comprise a holding screw. The holding screw may be fastened to the hub along the axis of the hub. The holding screw may be set against the disc stack. In various embodiments, the holding screw may prevent disc slippage in an axial direction. In various embodiments, the second end may define a stopper. The stopper may be set against the disc stack. The stopper and the holding screw may axially secure the disc stack to the hub.

A modular wheel assembly is also disclosed herein. The modular wheel assembly may comprise a hub. The hub may be a splined hub. The hub may define a plurality of spline recesses. In various embodiments, the modular wheel assembly may comprise an annular segment. The annular segment may comprise a plurality of splines extending from the annular segment. In various embodiments, each recess of the hub may be coupled to a complementary interlocking spline of the annular segment. In various embodiments, the annular segment may be slidably coupled to the hub. In various embodiments, the annular segment may be configured to slidably couple along an axis of the hub onto the hub so that the annular segment is radially outward the hub. In various embodiments, the hub may circumferentially retain the annular segment. In various embodiments, the annular segment may be made of at least one of a first material and a second material. In various embodiments, the annular segment may be made of a composite of the first material and the second material.

A cargo loading system is also disclosed herein. The cargo loading system may comprise a plurality of power drive units (PDU). In various embodiments, each PDU may comprise at least one modular wheel assembly. In various embodiments, the modular wheel assembly may comprise a hub. The hub may be a splined hub. The hub may define a plurality of spline recesses. In various embodiments, the hub may further define a PDU shaft cavity. The PDU shaft cavity may be configured to receive a PDU shaft.

The modular wheel assembly may further comprise a disc stack. In various embodiments, the disc stack may be coaxial to the hub. The disc stack may comprise a plurality of discs. Each disc of the disc stack may be configured to slidable couple along an axis of the hub onto the hub so that each disc of the plurality of discs is radially outward the hub. In various embodiments, the hub may circumferentially retain the disc stack. In various embodiments, each disc of the plurality of discs may comprise a ring and an annular segment. The annular segment may be molded onto the ring. In various embodiments, the annular segment may be made of one of a first material and a second material. In various embodiments, the ring may comprise a plurality of splines extending from the ring. In various embodiments, each spline of the ring may be coupled to a complementary interlocking recess of the hub.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 5A illustrates a cross-section view of a modular PDU tire assembly, including a cross-section of a PDU shaft, in accordance with various embodiments;

FIG. 5B illustrates an offset view of a splined hub, in accordance with various embodiments;

FIG. 5C illustrates a cross-section view of a modular PDU tire assembly, in accordance with various embodiments;

FIG. 6A illustrates an exploded view of a modular PDU tire assembly, in accordance with various embodiments;

FIG. 6B illustrates a side view of a splined tire disc having chip resistant rubber, in accordance with various embodiments;

FIG. 6C illustrates a side view of a splined tire disc having traction rubber, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
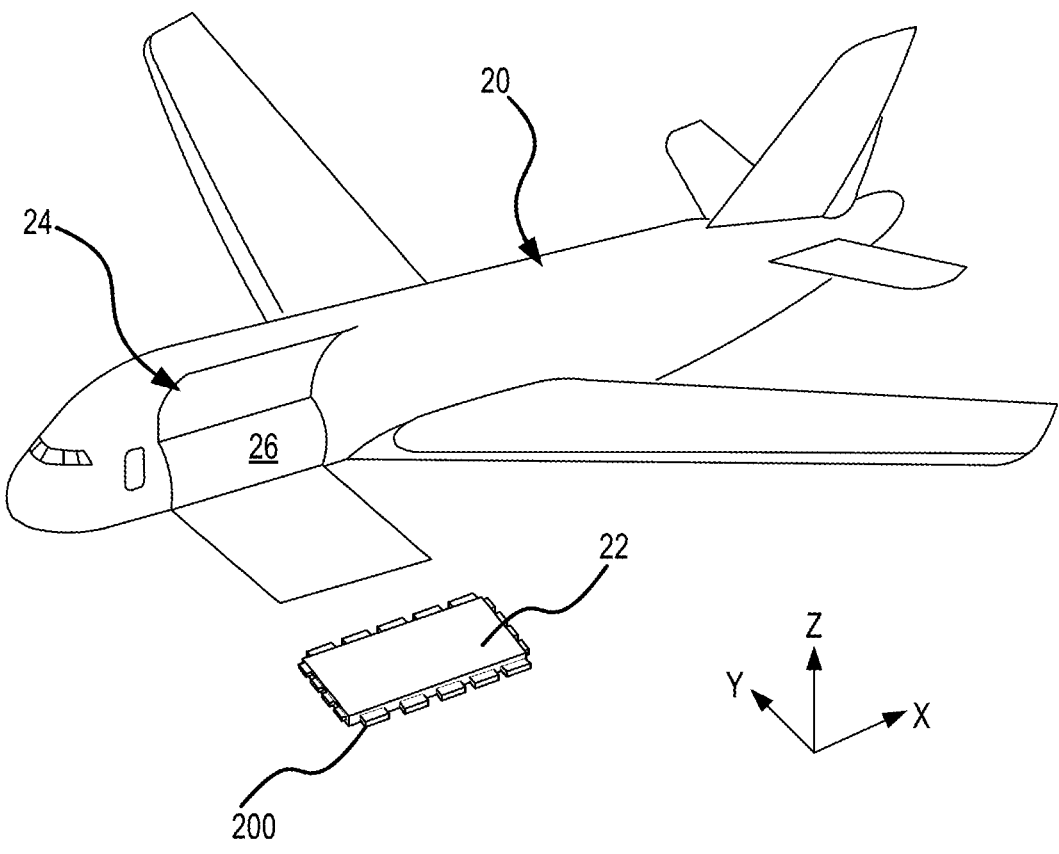
FIG. 1 illustrates an aircraft being loaded with cargo, in accordance with various embodiments.
Figure 2:
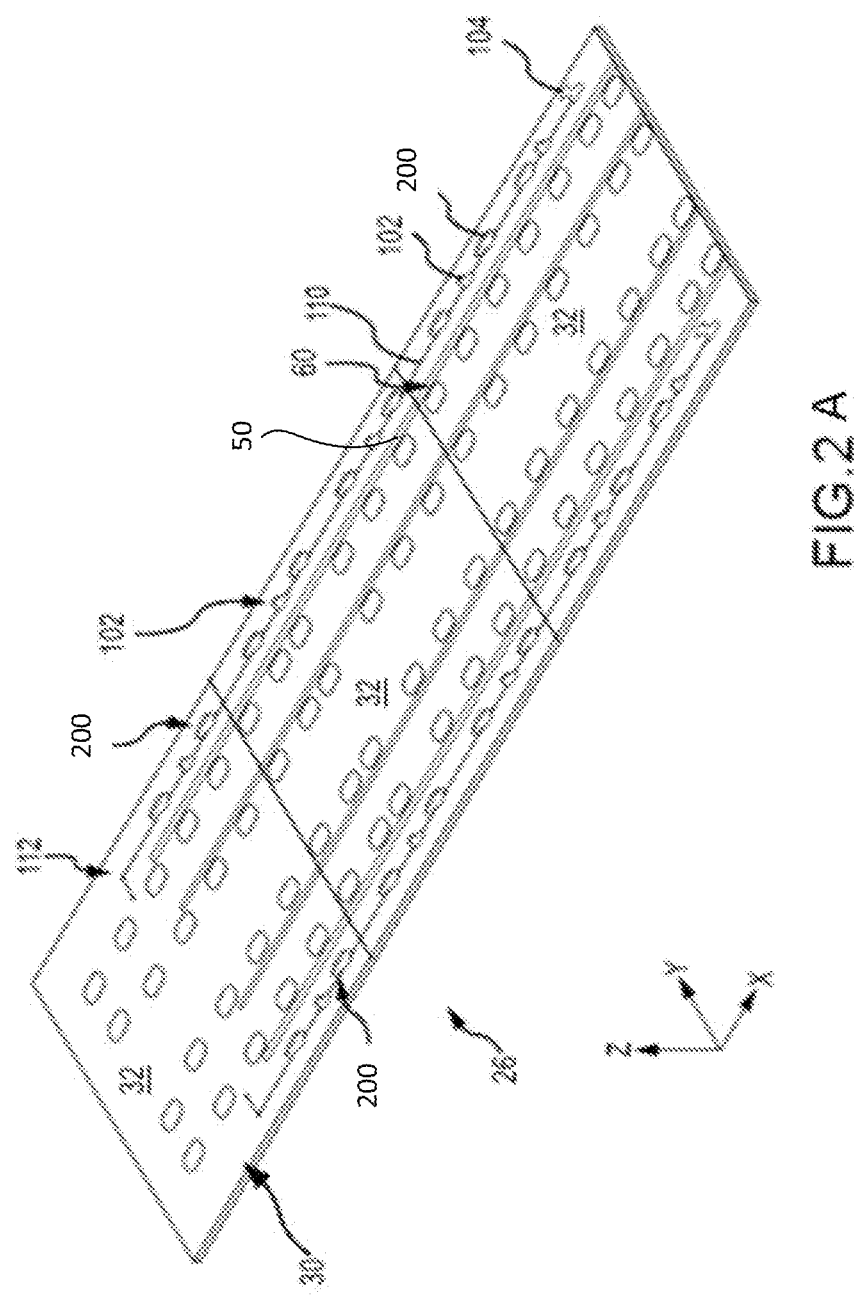
FIG. 2A illustrates a surface of an aircraft cargo deck having a PDU base, in accordance with various embodiments.
FIG. 2B illustrates a PDU, in accordance with various embodiments.

FIG. 1 illustrates an aircraft 20 with cargo 22 being loadable through a loading door 24 of the aircraft 20. Cargo 22 (e.g., a unit load device (ULD), pallet, or the like) may be loaded through loading door 24 and onto a cargo deck 26. FIG. 2A illustrates cargo deck 26. Cargo deck 26 includes a cargo deck floor 30, which may be formed by one or more panels 32 that are coupled to various structural components of aircraft 20 (e.g., to beams, floors, etc.).

With continued reference to FIG. 2A, in accordance with various embodiments, the cargo deck 26 includes a cargo restraint system 50. Stated differently, cargo restraint system 50 may be installed along cargo deck 26. Cargo deck 26 may also include a cargo loading system 60 comprising a plurality of freely rotating conveyance rollers and/or power drive units (PDUs) mounted in the cargo deck 26 to define the conveyance plane. Cargo loaded onto the aircraft cargo deck 26 can be moved throughout the cargo deck 26 using the cargo loading system 60.

Cargo restraint system 50 may be used to restrain cargo (e.g., unit load devices (ULDs)) within/relative to the cargo deck 26. The cargo restraint system 50 may include a plurality of first restraints 102 and one or more secondary restraints 104. The restraint system 50 may include an actuation assembly 110. A control region 112 of actuation assembly 110 may be located, for example, proximate loading door 24, with momentary reference to FIG. 1, a forward end of the aircraft, and/or at any other location that may be readily accessible to crew responsible for loading cargo into cargo deck 26. In various embodiments, a PDU may comprise a wheel assembly 200.

Figure 2B:
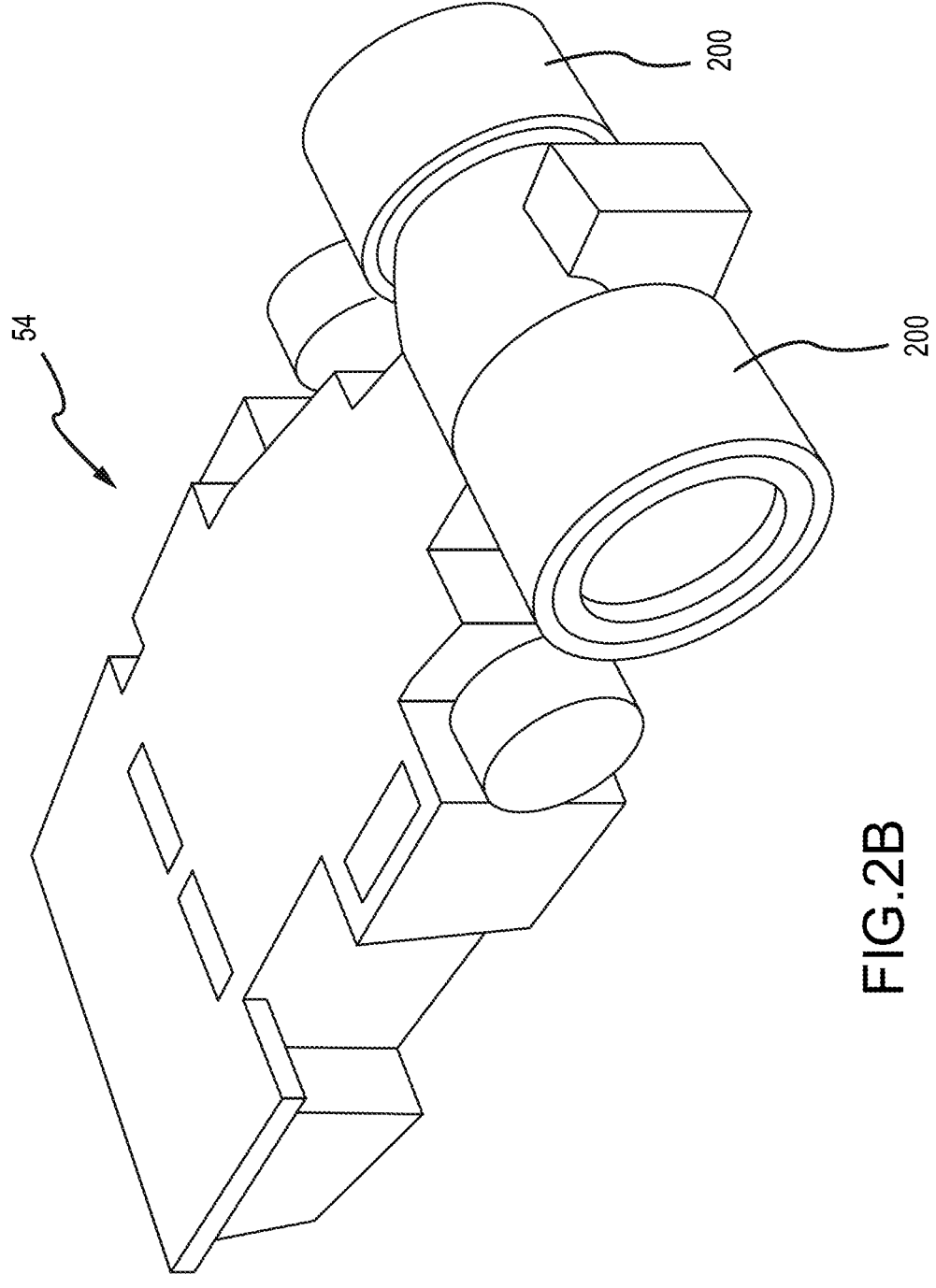

FIG. 2B illustrates a PDU 54 with a plurality of wheel assemblies 200. In various embodiments, the PDU 54 may comprise at least one wheel assembly 200. The PDU 54 may be configured to engage and propel cargo 22 throughout the cargo deck 26. The plurality of wheel assemblies 200 may be configured to engage and provide traction for the movement of any manner of cargo 22. In this regard, the tires may be employed to rotate to move cargo loaded onto the cargo deck 26. In various embodiments, the wheel assembly 200 may be a modular wheel assembly.

Figure 3:
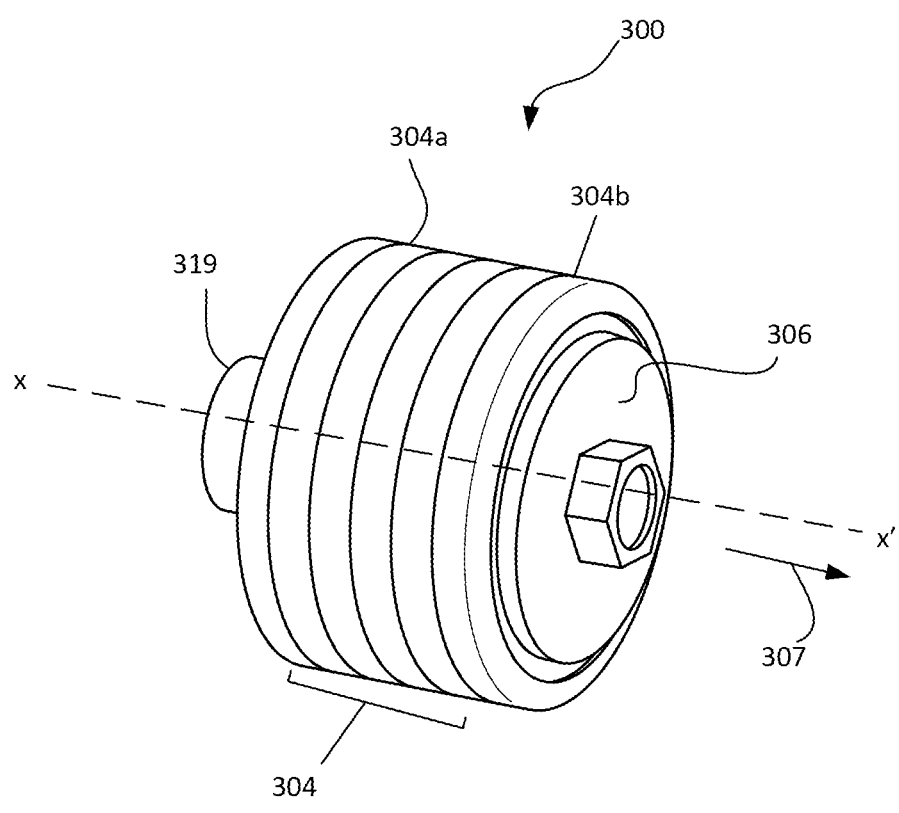
FIG. 3 illustrates an offset view of a modular PDU tire assembly, in accordance with various embodiments.
Figure 4A:
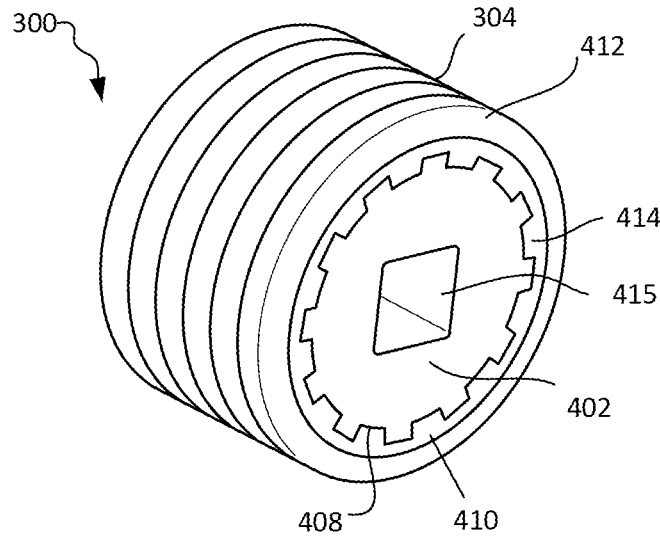
FIG. 4A illustrates an offset view of a modular PDU tire assembly, with a splined hub, in accordance with various embodiments.

FIGS. 3 and 4A illustrate a modular wheel assembly 300. The modular wheel assembly 300 may comprise a hub 402. In various embodiments, the hub 402 may rotatably couple to a component of the PDU 54, such as a PDU shaft 319, an axle, or any other suitable bar, rod, or central shaft for rotating a wheel or gear. The hub 402 may be configured to rotate in response to a drive motor of the PDU 54. The hub 402 may also be configured to engage and rotate in response to cargo 22 being rolled across the wheel assembly 300. The hub 402 may be made of any appropriate metal, such as steel, iron, aluminum, or any associated alloys, castings, or forgings.

The modular wheel assembly 300 may comprise a disc stack 304. In various embodiments, the disc stack 304 may be coaxial to the hub 402. In various embodiments, the disc stack 304 may comprise a plurality of discs (e.g., 304*a*, 304*b*). Each disc of the disc stack 304 may be configured to slidably couple to the hub 402. In various embodiments, the modular wheel assembly 300 may comprise a holding screw 306. The holding screw 306 may be coupled to the hub 402 and may be set against the disc stack 304. The holding screw 306 may be fastened to the PDU shaft 319. Accordingly, the holding screw 306 may be configured to secure the disc stack 304 to the hub 402, preventing disc slippage in an x' direction 307 along the x-x' axis. Stated another way, holding screw 306 secures disc stack 304 from slippage in an axial direction. Moreover, in the event that a disc of the disc stack 304 may be worn or damaged, the holding screw 306 may be unfastened and the damaged disc removed. The damaged disc, for example, disc 304*a,* may then be replaced. The modularity of repairing or replacing only the worn or damaged discs of the disc stack 304 may reduce overall maintenance costs.

Figure 4B:
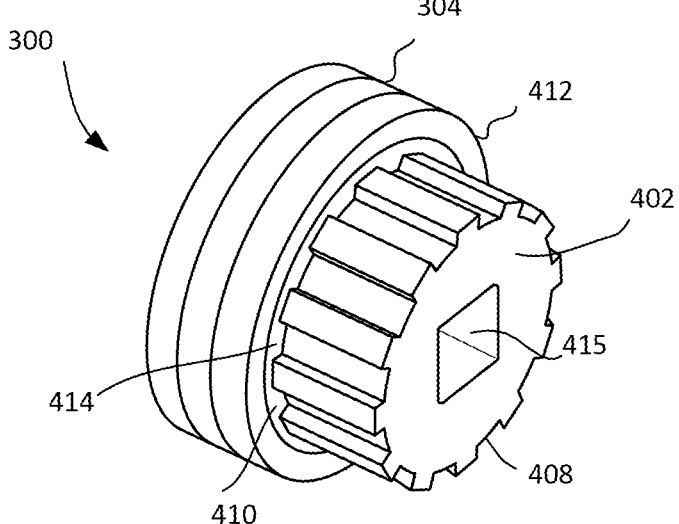
FIG. 4B illustrates an offset view of a modular PDU tire assembly, with a splined hub and a plurality of splined discs, in accordance with various embodiments.

Referring to FIGS. 4A and 4B, the modular wheel assembly 300 is shown. In various embodiments, the hub 402 of the modular wheel assembly 300 may define a holding screw cavity 415. The holding screw cavity 415 may receive the PDU shaft 319, which in turn may receive the holding screw 306. In various embodiments, the hub 402 may be a splined hub. The hub 402 may define a plurality of spline recesses 408. The cross-sectional profile of the recesses 408 may be of any shape, including, for example, a rectangle, square, oval, circle, and the like.

Each disc of the disc stack 304 may comprise a ring 410. The ring 410 may be made of any suitable metal, such as iron, iron alloys (e.g., steel, stainless steel, high carbon steel, austenitic steel), aluminum, aluminum alloys, titanium, titanium alloys (e.g., Ti-6Al-4V), and other metallic materials suitable for use on an aircraft. The ring 410 may be made by subtractive manufacturing, such as forging, castings, and milling or by additive manufacturing techniques. The ring 410 may further comprise a plurality of splines 414. As shown, the splines 414 may extend radially inward of the ring's 410 circumference. The splines 414 of the ring may be of a complementary profile with the spline recesses 408 of the hub 402, including, for example, a rectangle, square, oval, circle, and the like. In various embodiments, each spline recess 408 of the hub 402 may be coupled to, or interlock with, the complementary spline 414 extending from the ring 410. Accordingly, in various embodiments, each ring 410 may be circumferentially retained to hub 402 by the interaction of the spline recess 408 with the spline 414.

Each disc of the disc stack 304 may further comprise an annular segment 412. The annular segment 412 may be molded onto the ring 410. In various embodiments, the annular segment 412 may be molded onto the ring 410 using any suitable molding technique, such as injection molding, compression molding, or the like. In various embodiments, the annular segment 412 may be a tire.

Referring to FIGS. 5A, 5B, and 5C, the modular wheel assembly 300 is shown. As shown, the hub 402 of the wheel assembly 300 may comprise a first end 516 and a second end 518. The first end 516 may be distal the second end 518 along the x-x axis. In various embodiments, the holding screw 306 may be fastened to the PDU shaft 319 in the holding screw cavity 415 at the first end 516 of the hub 402. The holding screw 306 may be set against the disc stack 304. In various embodiments, the second end 518 may define a stopper 523. The stopper 523 may be set against the disc stack 304. The stopper 523 may be a flange, or a lip, of the hub 402. In various embodiments, the stopper 523 may be a plate fastened to the hub 402. The stopper 523 and the holding screw 306 may be configured to secure the disc stack 304 to the hub 402. Together, the stopper 523 and the holding screw 306 may exert axial pressure against the discs, which may prevent the formation of gaps between discs 304, or disc slippage in either direction along the x-x axis. Stated another way, the stopper 523 and the holding screw 306 may axially secure the disc stack to the hub 402. It may be advantageous to prevent gaps or disc slippage as the modular wheel assembly 300 rotates. Accordingly, and with further reference to FIGS. 4B and 5B, the ring's 410 plurality of splines 414 may interlock with the hub's 302 plurality of spline recesses 408, preventing circumferential slippage of the discs 304.

With reference to FIGS. 4B, 5A-C, and with further reference to FIG. 2B, the hub 402 of the modular wheel assembly may further define a PDU shaft cavity 517 at the second end 518. The PDU shaft cavity 517 may be configured to receive the PDU shaft 319 of the PDU 54. Accordingly, the PDU shaft 319 may be disposed within the hub 402 between the PDU shaft cavity 517 and the holding screw cavity 415. The splines 414 of the ring 410 interlocking with the spline recesses 408 of the hub 402 may help transfer torque from the PDU shaft 319 to the discs 304.

In various embodiments, the annular segment 412 of each disc of the disc stack 304 may be made of one of a first material 520 and a second material 522. In various embodiments, the annular segment 412 of each disc of the disc stack 304 may be made of a composite of the first material 520 and the second material 522. The first material 520 and the second material 522 may be different materials. In various embodiments, the first material 520 may be stiffer than the second material 522. For example, the first material 520 may be configured to have a greater wear resistance and greater abrasion resistance relative to the second material 522 as cargo 22 is rolled across the modular wheel assembly 300. Stated differently, annular segments 412 comprising the first material 520 may be configured to resist chipping as cargo 22 climbs onto the tire assembly 300.

In various embodiments, the first material 520 may be any suitable chip resistant material.

Suitable materials include, natural rubber, synthetic rubber, synthetic rubber with high carbon black composition, nitrile butadiene rubber, polyurethane rubber, neoprene, thermoplastic elastomer rubbers, styrene butadiene rubber (SBR), and the like. In various embodiments, the first material may exhibit cutting resistance and tearing resistance properties. In various embodiments, the second material 522 may be any suitable material for providing traction as a ULD rolls across the tire assembly 300. Suitable materials include, natural rubber, natural rubber with high silica composition, synthetic rubber, synthetic rubber with high carbon black composition, nitrile butadiene rubber, polyurethane rubber, neoprene, thermoplastic elastomer rubbers, styrene butadiene rubber (SBR), and the like. In various embodiments, the second material 522 may exhibit more compliance and offer a higher coefficient of friction than the first material 520. In various embodiments, the annular segment 412 may comprise a composite of the first material 520 and second material 522.

In reference to FIG. 6A, the disc stack 304 of modular wheel assembly 300 is shown disassembled. In various embodiments, and with further reference to FIG. 6B, the disc stack 304 may comprise terminal discs (626*a* and 626*b*) proximal the first end 516 and second end 518. In various embodiments, the terminal discs (626*a* and 626*b*) may be made of a first material 520. In various embodiments, and with further reference to FIG. 6C, the disc stack 304 may further comprise discs distal the first end 516 and the second end 518 (e.g., the distal discs 628). The distal discs 628 may be made of the second material 522. This may be advantageous since ULDs climbing onto the wheel assembly 300 may first contact the wheel assembly 300 at the terminal discs (626a and 626b), increasing the risk of chipping. Moreover, it may be advantageous for the distal discs 628 to comprise material suitable for traction to assist in moving cargo 22 down the cargo deck 26.

Figures 7A, 7B:
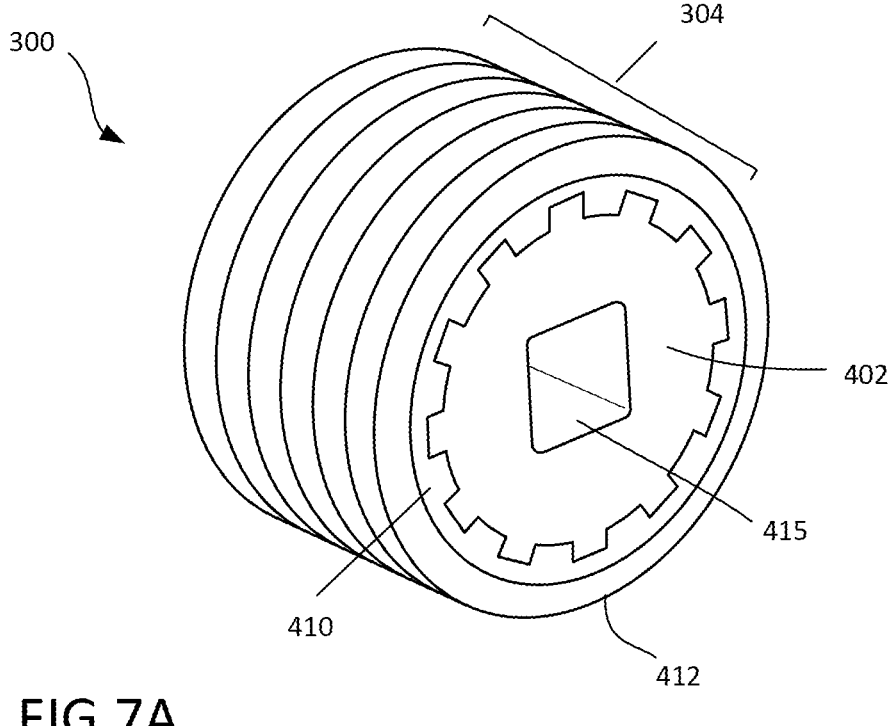
FIG. 7A illustrates an offset view of a modular PDU tire assembly, including a plurality of splined tire discs having the same rubber composition, in accordance with various embodiments.
FIG. 7B illustrates a cross-section view of a modular PDU tire assembly, including a plurality of splined tire discs having the same rubber composition, in accordance with various embodiments.
Figure 8A:
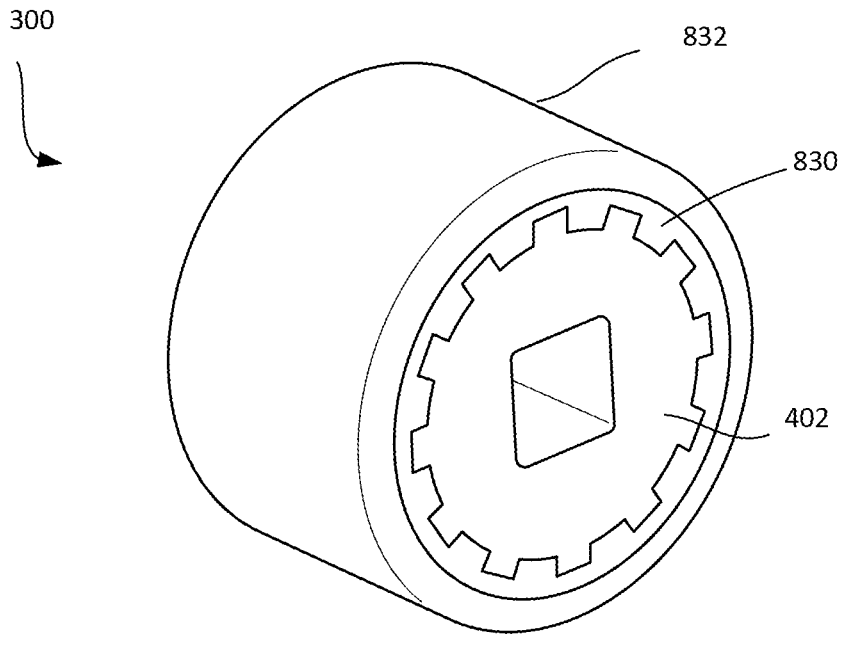
FIG. 8A illustrates an offset view of a splined PDU hub with a single tire, in accordance with various embodiments.
Figure 8B:
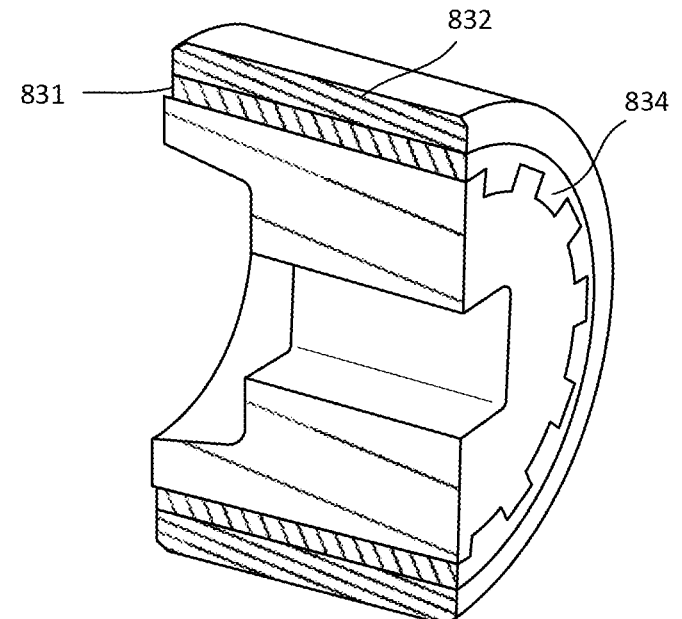
FIG. 8B illustrates as cross section view of a splined PDU hub with a single tire, in accordance with various embodiments.

FIGS. 7A and 7B further illustrate the modular wheel assembly 300. As shown, each disc of the disc stack 304 may comprise annular segments 412 comprising the second material 522. In various embodiments, each annular segment 412 may comprise the first material 520. FIGS. 8A and 8B further illustrate an alternative embodiment of the modular wheel assembly 800. As shown, the modular wheel assembly 800 may comprise a hub 402 and a single disc 830. The single disc 830 may comprise a single ring 831 having a plurality of splines 834 extending radially inward of the circumference of the ring 831. A single annular segment 832 may be molded onto the ring 831. The annular segment 832 may be made of one of the first material 520 and the second material 522. In various embodiments, the annular segment 832 may be made of a composite of the first material 520 and the second material 522. An annular segment 832 that is made of a composite of the first material 520 and the second material 522 may be, for example, an annular segment with distinct regions comprising either first material 520 or second material 522. The regions of the annular segment may be formed using injection molding techniques, compression molding techniques, and the like. The regions may be bonded together to form the composite using adhesives. Suitable adhesives may include cyanoacrylate adhesives, silicone adhesives, acrylic adhesives, contact adhesives, solvent-based adhesives, epoxies, and the like. An advantage of the single annular segment 832 may be overall cost reduction in repair and maintenance. For instance, the annular segment 832 may be removed from the ring 831, retreaded, and reinstalled onto the ring 831.

Figure 9A:
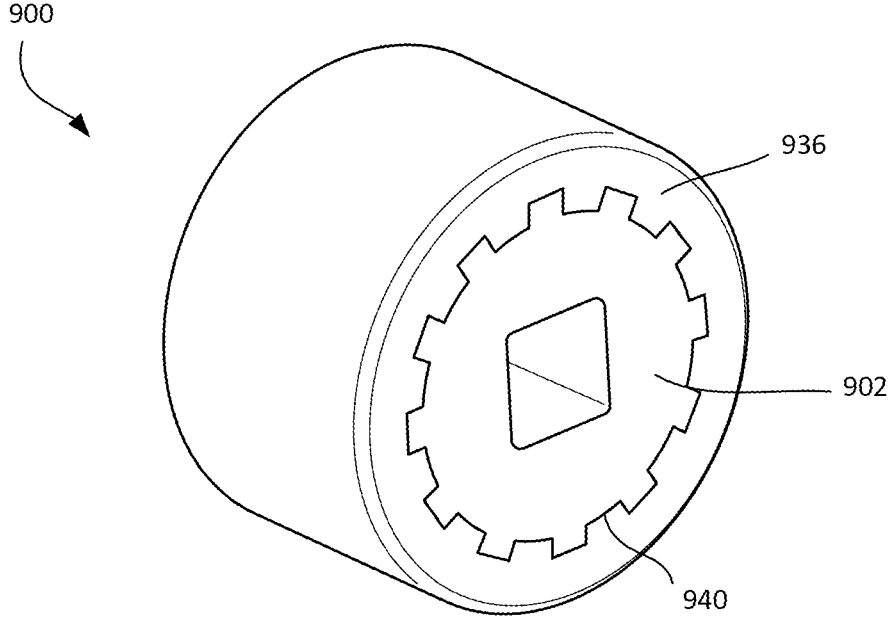
FIG. 9A illustrates an offset view of a PDU tire assembly having tire rubber with integrated splines and a splined hub, in accordance with various embodiments.
Figure 9B:
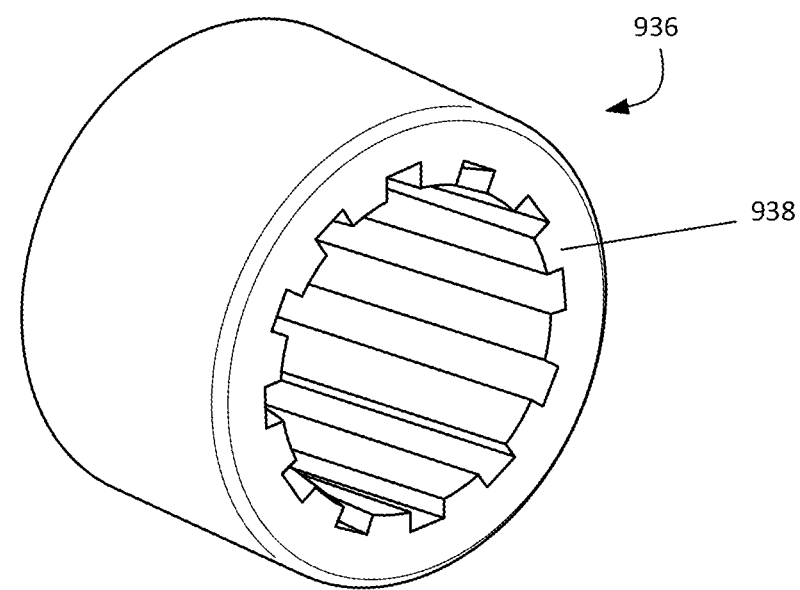
FIG. 9B illustrates an offset view of a PDU tire assembly having tire rubber with integrated splines, in accordance with various embodiments.

Referring to FIGS. 9A and 9B, a modular wheel assembly 900 is also disclosed herein. The modular wheel assembly 900 may be an alternative embodiment of modular wheel assembly 300. In various embodiments, the modular wheel assembly 900 may comprise a hub 902. The hub 902 may be a splined hub defining a plurality of spline recesses 940. In various embodiments, the modular wheel assembly may comprise an annular segment 936. The annular segment 936 may be slidably coupled to the hub 902. In various embodiments, the annular segment 936 may comprise one of a first material and a second material.

The annular segment 936 may comprise a plurality of splines 938 extending from the annular segment 936. In various embodiments, each spline 938 of the annular segment 936 may be complementary in profile to a spline recess 940 of the hub 902. In various embodiments, each spline in the plurality of splines 938 may be coupled to, or interlock with, a recess in the plurality of recesses 940. An advantage of the splined annular segment 936 may be weight reduction of the overall modular wheel assembly 900, in that the splined annular segment 936 may obviate the need for a corresponding ring.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A modular wheel assembly, comprising:

a hub, wherein the hub is a splined hub; and a disc stack, wherein the disc stack is coaxial to the hub, wherein the disc stack comprises a plurality of discs, and wherein each disc of the plurality of discs is configured to slidably couple along an axis of the hub onto the hub so that each disc of the plurality of discs is radially outward the hub, wherein the hub circumferentially retains the disc stack, wherein the hub further comprises a first end and a second end, wherein the first end is distal the second end, wherein the first end comprises a holding screw, wherein the holding screw is set against the disc stack, wherein the holding screw prevents disc slippage in an axial direction, wherein the second end defines a stopper, wherein the stopper is set against the disc stack, and wherein the stopper and the holding screw axially secure the disc stack to the hub.

2. The modular wheel assembly of claim 1, wherein the hub defines a plurality of spline recesses.

3. The modular wheel assembly of claim 2, wherein each disc of the plurality of discs comprises a ring and an annular segment and wherein the annular segment is molded onto the ring.

4. The modular wheel assembly of claim 3, wherein the ring comprises a plurality of splines extending from the ring.

5. The modular wheel assembly of claim 4, wherein each spline recess of the plurality of spline recesses of the hub is coupled to a complementary interlocking spline of the plurality of splines extending from the ring.

6. The modular wheel assembly of claim 3, wherein the annular segment is made of at least one of a first material and a second material.

7. The modular wheel assembly of claim 6, wherein the first material is stiffer than the second material and wherein the first material and the second material are different materials.

8. The modular wheel assembly of claim 7, wherein the plurality of discs comprises terminal discs proximal the first end and proximal the second end and wherein each annular segment of each of the terminal discs is made of the first material.

9. The modular wheel assembly of claim 8, wherein the plurality of discs comprises distal discs distal the first end and distal the second end and wherein each annular segment of each of the distal discs is made of the second material.

10. The modular wheel assembly of claim 3, wherein the annular segment is made of a composite of a first material and a second material.

11. A cargo loading system, comprising:
a plurality of power drive units (PDU), each PDU comprising at least one modular wheel assembly, wherein the at least one modular wheel assembly comprises:
a hub, wherein the hub is a splined hub; and
a disc stack, wherein the disc stack is coaxial to the hub, wherein the disc stack comprises a plurality of discs, wherein each disc of the plurality of discs is configured to slidably couple along an axis of the hub onto the hub so that each disc of the plurality of discs is radially outward the hub, wherein the hub circumferentially retains the disc stack, wherein the hub further comprises a first end and a second end, wherein the first end is distal the second end, wherein the first end comprises a holding screw, wherein the holding screw is set against the disc stack, wherein the holding screw prevents disc slippage in an axial direction, and wherein the hub further defines a PDU shaft cavity and wherein the PDU shaft cavity is configured to receive a PDU shaft.

12. The cargo loading system of claim 11,
wherein the hub further defines a plurality of spline recesses,
wherein each disc of the plurality of discs comprises a ring and an annular segment, wherein the annular segment is molded onto the ring, wherein the annular segment is made of at least one of a first material and a second material, wherein the ring comprises a plurality of splines extending from the ring, and
wherein each spline of the plurality of splines of the ring is coupled to a complementary interlocking recess of the plurality of spline recesses of the hub.

\* \* \* \* \*